Figure 1:
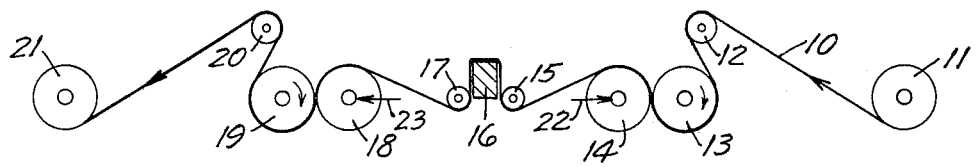

Jan. 25, 1966    C. BAUER    3,231,557
TRANSLUCENT FILM AND METHOD OF MAKING
Filed May 19, 1960

INVENTOR
CHARLES BAUER
BY Carpenter, Abbott, Coulter & Kinney
ATTORNEYS

United States Patent Office 3,231,557
Patented Jan. 25, 1966

3,231,557
TRANSLUCENT FILM AND METHOD OF MAKING
Charles Bauer, St. Paul Park, Minn., assignor to Minnesota Mining and Manufacturing Company, St. Paul, Minn., a corporation of Delaware
Filed May 19, 1960, Ser. No. 30,244
5 Claims. (Cl. 260—92.8)

This invention relates to the translucentizing or opacifying of initially clear and transparent plastic or polymeric film materials by processes involving physical manipulation and without the addition or incorporation of pigments or fillers or other extraneous materials normally required for such effects. The process is capable of producing lustrous, pearlescent or opaque film products having high aesthetic appeal and useful as wrappings or coverings or for various decorative purposes. In certain specific preferred modifications the process is particularly applicable to the preparation of heat-sensitive copy-sheet material having utility in the preparation of projection transparencies by thermographic duplication procedures involving brief intense irradiation of printed documents or other differentially radiation-absorptive graphic originals while in heat-conductive pressure-contact with the heat-sensitive sheet material.

It has now been found that controlled translucency may easily and economically be imparted to certain clear transparent polymeric film materials by processes involving the step of preliminarily drawing the film sharply over a smooth-edged breaker bar or the like under moderate tension and at appropriate temperature.

One exemplary transparent film product which has been found particularly satisfactory for producing translucent heat-sensitive copy-sheets by means of procedures herein to be more fully described is "Luvitherm" unplasticized polyvinyl chloride film. In preparing such film, emulsion polymerized polyvinyl chloride of high molecular weight is mixed with small amounts of stabilizers and waxy lubricants, warmed on steel rolls, calendered at high roll pressure into thin transparent film, and rapidly fused. The film is essentially non-oriented, although some slight amount of orientation is unavoidably imparted during the calendering operation. For example, a measured segment of a typical film of this type, having initial dimensions of 10 x 10 inches, is found to relax, when heated for two minutes in an oven at 130° C., to a final dimension of 9¼ inches in the machine direction and 10¼ inches in the crosswise direction. The film is about 1½ mils (0.015 inch) in thickness. Useful results may also be obtained with films of other thicknesses within at least the approximate range of ½–10 mils.

Other specific films which likewise have been found useful in the practice of the invention include extruded films of polypropylene and of polyethylene terephthalate, and solvent-cast films of polyvinyl chloride and of polystyrene. On the other hand, certain other films do not translucentize under treatment as herein described; for example, films of polyamide (nylon) and of polyethylene have remained fully transparent when pulled under tension across the smooth edge of a breaker bar. It has been observed, however, that transparent films which are capable of being translucentized over the breaker bar have the common property of opacifying at fold lines, whereas films which do not opacify when folded cannot effectively be translucentized on the bar. The test is conveniently applied by folding the film into a tight crease between the thumb and fingers in the desired direction and then unfolding and flattening the film and observing the crease line. Films useful in the practice of the invention are found to unfold and flatten without breaking and to show a distinct opaque line at the fold area; i.e., they are "fold-opacifiable."

In some instances a film may pass the fold test when creased in one direction but fail to show the opaque line when creased in a direction at right angles thereto. In such cases the film may be translucentized by drawing over the breaker bar with the bar at an angle to the ineffective second crease line. The effect is particularly noticeable in unidirectionally oriented film, the orientation reducing or eliminating the ability of the film to be translucentized with the bar at right angles to the direction of orientation.

Plasticized film may be translucentized provided the amount of plasticizer is sufficiently restricted. Polymers which form normally brittle films may be plasticized sufficiently to permit the film to be creased and re-flattened without breaking, but larger amounts of plasticizer will frequently result in failure of the film to be translucentized. Since specific plasticizers and combinations of plasticizers differ in their effects on the same or different polymers, reliance must be placed on the fold test in determining the suitability of any particular formulation.

The effect of elevated temperatures on polymeric films is similar to the effect of plasticizers in softening and weakening the film; and temperature must therefore be controlled in the practice of the invention. With the "Luvitherm" film hereinbefore described, effective translucentizing may be accomplished without excessive film deformation at up to about 150° F. Orientation of "Luvitherm" films is conventionally carried out at temperatures of the order of 200° F. without imparting any observable translucency.

The translucent appearance of the film following the action on the breaker bar is believed to be due to the formation of innumerable tiny voids within the film. In possible explanation, it is suggested that the drastic differential surface elongation imparted to the two major surfaces of the film as it is drawn over the breaker bar causes excessive but highly localized internal strains across the thickness of the film, resulting in internal disruption and the establishing of minute voids or pockets. Light is then refracted from the surfaces of such voids, resulting in the observed translucency. Also it has been noted that the density of the thus treated film is inversely proportional to the degree of opacity imparted by the treatment, thus providing further support for this theory of operation. The presence of the waxy lubricant or other equivalent source of discontinuity in the coherent polymeric structure presumably aids the internal disruption by providing points of weakness within the polymeric film. But regardless of theory, it is now found that clear transparent thin polymeric film products which at room temperature pass the fold test, i.e. do not break or crack but instead form a permanently opaque fold line on being tightly creased and re-flattened, are readily translucentized and reduced in density by being pulled under moderate tension over a smooth-edged breaker bar as herein described and illustrated.

Once a film has been drawn over the breaker bar and given an initial degree of translucency, it is possible to increase the translucency by simple stretching of the film. It is ordinarily preferable, however, to repeat the action over the breaker bar in imparting additional degrees of translucency, since the procedure is susceptible of more accurate control and produces a more uniform translucency than is otherwise the case. In this connection, bending the film in opposite directions during repeated trips over the breaker bar is much more effective than repeated bendings in the same direction.

Full opacity may be attained by continued processing and particularly by preliminary partial translucentizing over the breaker bar followed by bidirectional stretching and orientation of the film at 200° F., for example in a tenter frame. The resulting film has an attractive pearlescent sheen and is particularly desirable as a decorative wrapping material.

The transparencies produced with the translucentized films of this invention by thermographic copying procedures may be improved for direct visual use by providing added color at the transparentized image areas. For example, a thin paper or film sheet material coated with a colored wax or a volatile dye, and inserted between the translucent film and the graphic original of which a copy is desired, results in simultaneous transparentizing of the film and transferring of the wax or dye to the film at the heated image areas. In another modification, the translucent film is itself provided with a thin transparent visibly heat-sensitive coating, the coating being darkened and the film being simultaneously transparentized at the heated image areas during the copying procedure. Clear transparent colored polymeric films may be translucentized as herein described and when locally heated revert to colored transparent condition.

Figure 2:
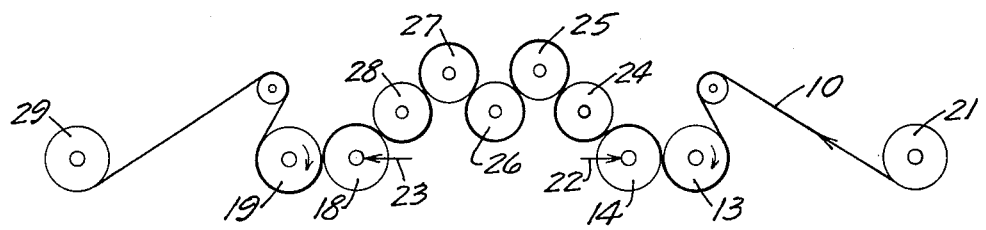

In the drawing,

FIGURE 1 is a schematic representation of a form of apparatus which has been found useful in the preliminary processing of the transparent film as hereinbefore described, and FIGURE 2 schematically represents a conventional form of apparatus useful in the further processing of film which has been treated in the apparatus of FIGURE 1.

In FIGURE 1, the film 10 from stock roll 11 is drawn around idler roller 12, between squeeze rolls 13 and 14, around idler roller 15 and over the top of breaker bar 16. The film then passes around idler roller 17, between squeeze rolls 18 and 19, and around idler roll 20, and is wound up into stock roll 21. Tension is applied by driven roll 19 and pressure roll 18 in conjunction with braking roll 13 and pressure roll 14. Pressure rolls 14 and 18 are adjustably positioned with respect to rolls 13 and 19 respectively, as indicated by arrows 22 and 23, to provide for maintaining proper friction between film and roll. The driven roll 19 is operable at any desired speed, and the brake roll 13 may be restrained to any desired extent so as to produce in the intervening portion of the film 10 any desired degree of tension.

The breaker bar 16 is provided with straight or slightly bowed smooth edges for scratch-free, uniform contact with the film, and may for example comprise a steel bar having a rectangular cross-section with the film-contacting corners rounded at a radius within the range of approximately 2–30 mils, about 3 mils being a preferred radius. The single rectangular bar 16 illustrated thus provides two parallel bend lines for the film, and an intervening flat contact area; but one or more triangularly cross-sectioned bars, or other forms providing only a single bend line, are also effective.

As the film is drawn under tension over the edges of the bar 16, and particularly as it passes the second of the two edges, it is observed to become cloudy or partially translucent to a degree depending upon a number of factors including the formulation and previous history of the film, the tension applied to the film, the temperature of the film, the radius of the edge or edges of the bar, and perhaps other factors as hereinbefore indicated. The film is then drawn between the squeeze rolls 18 and 19 and is wound up on stock roll 21. It may then be returned through the apparatus in the opposite direction, in which case the roll 13 becomes the driven roll and braking action is applied through roll 19. Alternatively, the roll 21 of partially translucentized film may replace stock roll 11 and the film may be drawn through the apparatus in the same direction in one or more succeeding trips while contacting the bar 16 from the same or from opposite sides of the film during alternate succeeding passes.

The apparatus of FIGURE 2 may alternatively be employed in imparting a further degree of translucency to the film after an initial passage over the breaker bar of FIGURE 1. In the apparatus indicated in FIGURE 2, the terminal sections are identical with those of FIGURE 1, but the bar 16 and rollers 15 and 17 will be seen to be replaced by idler rolls 24–28; and the stock roll 21 of partially translucentized film replaces the roll 11 of clear transparent film, while the roll 29 of fully translucentized film product replaces the roll 21 of FIGURE 1. The film 10 is drawn around the several idler rolls 24–28 under specified stretch conditions determined by the relative speeds of the drive roll 19 and brake roll 13 which in this case is positively driven at a predetermined speed slightly less than that of the roll 19. The several rollers are closely spaced, as shown, to prevent film neck-down without applying pressure to the film.

Although the partially translucentized film may thus be given increased translucency in the apparatus of FIGURE 2, it has surprisingly been shown that the initial fully transparent film cannot be thus translucentized, at least in any commercially significant operation. Without the preliminary passage of the film over the breaker bar, mere stretching of the film is invariably found to cause localized tearing rather than uniform translucentizing. For example, a clear "Luvitherm" film stretched at 200° F. to double its original dimensions both lengthwise and crosswise in a tenter frame, as in producing biaxially oriented film, remains clear and transparent. Other portions of the clear film are passed through the apparatus of FIGURE 2 at various elongation factors and speeds and at room temperature, as follows:

| Sample | Elongation | Speed, ft./min. |
| --- | --- | --- |
| 1 | 1.1:1 | 10 |
| 2 | 1.3:1 | 2 |
| 3 | 1.2:1 | 100 |
| 4 | 1.15:1 | 20 |

In all cases, irregular localized or partial translucentizing occurs, with film failure first at localized areas and then across the entire width.

EXAMPLE 1

Transparent 1.5-mil non-oriented "Luvitherm" polyvinyl chloride film containing small amounts of stabilizer and lubricant as hereinbefore identified, and forming a permanently opaque crease line when tested by the fold test, is passed through the apparatus of FIGURE 1 under moderate tension. With a portion of the film, several passes are made, in opposite directions and with the same side of the film in contact with the breaker bar. The film progressively becomes visibly more translucent. After five to six passes it is sufficiently translucent to provide fully effective light-dispersion for background areas of projection transparencies. The film is then placed in contact with a printed original and passed through a thermographic copying machine, e.g. of the type described in Kuhrmeyer et al. U.S. Patent No. 2,891,165. The film is re-transparentized at the heated image areas to an extent amply sufficient to provide effective image areas on the projection screen. Equivalent localized transparency is obtained by briefly contacting the film, suitably supported on a paper carrier, with a heated metal test bar at a transparentizing temperature within the range of about 90–95° C.

After the first pass over the breaker bar, another portion of the film is again passed over the bar but with the opposite surface of the film in contact with the bar, i.e. with the bend in the opposite direction. Further successive passes are made, in each case with the film in the reverse position as compared with the previous pass. After two passes, i.e. one on each face, the translucency of the film is somewhat greater than that obtained in five to six passes with the first portion of the film. The translucent film provides effective projection transparency copies of printed originals in the thermographic copying process.

The degree of translucency of the film products of Example 1 in terms of the percentage of incident light transmitted through the film and available at a projection screen is more accurately determined by means of a photocell and appropriate optical and electrical equipment, yielding the following comparative values on a scale on which full tranparency (absence of sample) is 100% and complete opacity (black paper sample) is 0% transmission. Thus a sample which gives a reading of 10% of that obtained with the same source of visible light in the absence of the film will be characterized as having a light-transparency of 10%.

*Percent transmission*

| No. of passes | Film drawn over bar on— | | | |
|---|---|---|---|---|
| | Same side | | Alternate sides | |
| | B | I | B | I |
| 1 | 37 | 68 | 24 | 66 |
| 2 | 30 | 66 | 3 | 44 |
| 3 | 11 | 53 | 1 | 28 |
| 4 | 5 | 42 | 0.5 | 11 |
| 6 | 3 | 25 | | |
| 8 | 1 | 15 | | |

In the table, "B" indicates the percentage direct (non-diffuse) transmissivity through the background area, i.e. through the translucentized film, whereas "I" indicates percentage transmissivity through an image area formed by thermographic reproduction of a printed area of adequate size on a graphic original. The headings indicate the manner in which the film was passed over the breaker bar, as described in the example. It will be observed from the tabulated data that the same degree of translucency is obtained with three passes on alternate sides as is obtained with eight passes on the same side, and that the former film is more effectively heat-transparentized than is the latter film when subjected to thermographic copying procedures.

EXAMPLE 2

Strips of the "Luvitherm" film as used in Example 1, cut to one inch width, are translucentized by pulling over the breaker bar in a hand operation. The film is maintained under a tension of approximately two pounds and is pulled forward and back over the bar once on each face of the strip. The entire operation is conducted in an oven, different strips being treated at different temperatures ranging from normal room temperature up to about 180° F. All other conditions are maintained essentially constant. The resulting translucentized strips are further tested as heat-sensitive copy-sheets for thermographic printing in the manner described under Example 1.

Essentially identical results are obtained at oven temperatures up to about 150° F. The strips are translucentized to an appearance equivalent to that obtained in Example 1 by four passes on alternate sides. The heated image areas are effectively transparentized to an equivalent degree, and the copies provide excellent projection transparencies for use with the "Vu-Graph" projector.

At 158° F. the film stretches considerably during its passage over the bar, and translucency is reduced although effective projection transparencies may still be prepared.

At 172° F. the stretch is still more pronounced, and projection transparencies prepared from the resulting product, while still useful, are much less effective than the preceding specimens.

Strips pulled over the bar at an oven temperature of 178–185° F. stretch extensively and become only faintly cloudy; they are not suitable for the preparation of useful projection transparencies.

EXAMPLE 3

"Luvitherm" film as in Example 1 is first oriented in the machine direction by passing through a machine as described in connection with FIGURE 2. The operation is performed at 200° F. and at varying degrees of lengthwise or machine-direction elongation up to 100% as obtained by varying the relative surface speeds of pull drums 13 and 19. The film remains fully transparent. The several portions are then tested in the fold test, and are each given four passes, also in the machine direction and on alternate faces, over the breaker bar in the apparatus of FIGURE 1, under constant tension and at room temperature.

After 10% elongation the film passes the fold test, becomes translucent in four passes over the breaker bar and transparentizes at heat-image areas to yield an effective projection transparency.

After 20% elongation the translucency obtainable in four alternate passes is somewhat less than that of the 10% sample but the resulting projection transparency provides fully adequate contrast.

After 30% elongation of the film the resulting product is distinctly less translucent and many of the transparentized image areas are indistinct, although the copy still makes a readable projection image.

After 40% elongation only a moderate translucency is obtained, and the heated image areas, although visibly distinct, are not transparent; and the copy areas are cockled. The projection image obtained on a "Vu-Graph" overhead projection apparatus is inadequate.

After 60% elongation the film no longer whitens significantly in the fold test applied across the machine direction; almost no translucency is imparted by the breaker-bar treatment; and heated image areas are badly cockled.

All samples are effectively translucentized by pulling over the breaker-bar in the crosswise direction; and the fold test likewise provides an opaque crease line parallel to the machine direction. Those samples initially elongated to the extent of about 40–60% and then translucentized in the crosswise direction on the breaker bar are found to cockle badly when heated, e.g. in the thermographic copying process; at still higher initial elongation, perforation occurs at the heated areas.

EXAMPLE 4

To show the correlation between translucency and density, "Luvitherm" film as used in Example 1 is drawn over the breaker bar a sufficient number of passes to provide the desired appearance. Light transmission is measured as noted in Example 1. Density is determined by means of a density gradient column and reported as grams/cc. Areas of the translucent film prepared with four passes over the bar are then re-transparentized by thermographic copying techniques and the transparentized areas again measured.

The results at various passes on the same side of the film are:

| No. passes | Percent Transm. | Density |
|---|---|---|
| Original film | 90 | 1.370 |
| 1 | 37 | 1.352 |
| 4 | 5.0 | 1.336 |
| 7 | 1.8 | 1.325 |
| 10 | <1 | 1.308 |
| 4 passes, re-transparentized | 45 | 1.365 |

Alternate bending in opposite directions yields the following:

| No. passes | Percent Transm. | Density |
|---|---|---|
| 1 | 24 | 1.350 |
| 2 | 3 | 1.325 |
| 3 | 1.0 | 1.308 |
| 5 | 0.5 | 1.285 |
| 10 | <0.5 | 1.255 |

The decrease in density of the film is accompanied by moderate elongation. In a separate test, measurements made at intervals along the roll of film during each of several successive passes with opposite faces of the film alternately contacting the breaker-bar give the following values:

| No. passes: | Avg. length of measured segment, inches |
|---|---|
| 0 | 10 |
| 1 | 10.24 |
| 2 | 10.85 |
| 3 | 11.32 |
| 4 | 11.74 |
| 5 | 11.97 |
| 6 | 12.27 |

On standing for 24 hours at room temperature under no tension, the samples show about 1–3% shrinkage but no observable change in density or light-transmission.

EXAMPLE 5

The "Luvitherm" polyvinyl chloride film employed in the preceding examples contains small amounts of stabilizers, e.g., .2–1% of diphenyl thiourea, for preventing degratation of the polymer, and waxy lubricants, e.g. 1–5% of refined montan wax, for ease in calendering.

Unmodified polyvinyl chloride resin ("Geon 101") is dissolved in hot tetrahydrofuran and a thin transparent film of the polymer is prepared by casting on a glass surface followed by evaporation of the solvent. Similarly, a thin transparent film is prepared from a mixture of 103 parts by weight of the "Geon 101" resin and 1.8 parts of "E" wax, a purified montan wax commonly employed as a lubricant in "Luvitherm" film compositions. The first film fails to pass the fold test and does not become translucent after several passes under tension across the breaker bar. The second film forms a distinct white crease line in the fold test, is transulucentized on being drawn under tension across the breaker bar, and forms a visible image under thermographic copying procedures.

On the other hand, a thin film of polystyrene prepared by a similar casting procedure using acetone as the solvent is found to pass the fold test, to become translucentized by passing under tension over a breaker bar, and then to transparentize on local heating in thermographic copying. The polystyrene is obtained in the form of a thick and somewhat easily shattered partially stretch-oriented film and is believed to be essentially free of additives. However it is observed that the film is not adequately flexible for the type of handling normally experienced by copies of office correspondence and the like, and the translucency appears to be in the form of oriented fine cracks rather than true voids within the film.

Other transport films which show a permanently opaque crease line in the fold test in at least one direction, and which are translucentized on being drawn across the breaker bar disposed parallel to said crease line, include thin films of extruded polypropylene, or of extruded polyethylene terephthalate polyester containing about one-half percent of polyethylene or polypropylene added during esterification, or of the same polyester containing about ten percent of polycarbonate resin (GE "Lexan" resin) added during extrusion.

EXAMPLE 6

A portion of the clear "Luvitherm" film as used for Example 1 is first drawn over the breaker-bar one pass in the lengthwise direction at room temperature, followed by orientaiton in a tenter frame at 200° F. and to 100% elongation in both directions. The resulting film is glossy white or pearlescent in appearance and is essentially opaque, although typewritten messages may be read through the film in contact with the printed surface. The product shrinks and buckles badly and is not effectively transparentized when locally heated in the thermographic copying process, but forms an attractive wrapping film. Essentially the same results are obtained when the film is tentered at room temperature.

What is claimed is as follows:

1. A thin smooth-surfaced translucent film product formed by a process comprising drawing a thin transparent fold-opacifiable polyvinylchloride film sharply over a smooth narrow edge and under sufficient tension to impart drastic differential surface elongation to the two major surfaces of the film and at a temperature not higher than about 150° F.

2. A thin smooth-surfaced translucent film product capable of being rendered transparent by brief contact with a metal test bar at 95° C. and with less than about 30% shrinkage, produced by a process comprising drawing a thin transparent unplasticized unpigmented fold-opacifiable polyvinylchloride film sharply over a smooth narrow edge and under suffiicent tension to impart drastic differential surface elongation to the two major surfaces of the film and at a temperature not higher than about 150° F.

3. Method of making a thin smooth-surfaced translucent film product comprising drawing a thin transparent fold-opacifiable polyvinylchloride film sharply over a smooth narrow edge and under sufficient tension to impart drastic differential surface elongation to the two major surfaces of the film and at a temperature not higher than about 150° F.

4. The method of claim 3 in which the narrow edge has a radius of about three mils.

5. Method of making a thin smooth-surfaced translucent film product comprising first drawing a thin transparent fold-opacifiable polyvinylchloride film sharply over a smooth narrow edge and under sufficient tension to impart drastic differential surface elongation to the two major surfaces of the film and at a temperature not higher than about 150° F., and then uniformly stretching the film.

References Cited by the Examiner

UNITED STATES PATENTS

| | | | |
|---|---|---|---|
| 2,137,627 | 11/1938 | Reed | 260—92.8 |
| 2,234,122 | 3/1941 | Heck | 250—42 |
| 2,352,725 | 7/1944 | Markwood | 18—48 |
| 2,683,103 | 7/1954 | Smook et al. | 154—43 |
| 2,721,941 | 10/1955 | McMaster et al. | 250—42 |
| 2,784,456 | 5/1957 | Grabenstein | 18—48 |
| 2,812,550 | 11/1957 | Chavannes | 18—48 |
| 2,924,545 | 2/1960 | Daly | 154—43 |
| 2,925,625 | 2/1960 | Souza | 18—61 |
| 2,948,583 | 8/1960 | Adams et al. | 264—210 |
| 2,980,964 | 4/1961 | Dilke | 264—489 |
| 3,007,204 | 11/1961 | Veiel et al. | 264—289 |

FOREIGN PATENTS

| | | |
|---|---|---|
| 497,689 | 12/1938 | Great Britain. |
| 589,513 | 12/1959 | Canada. |

OTHER REFERENCES

Schildknecht: Vinyl and Related Polymers, Wiley, New York, 1952, page 424.

JOSEPH L. SCHOFER, Primary Examiner.

M. V. BRINDISI, H. N. BURSTEIN, LOUISE P. QUAST, J. R. LIBERMAN, Examiners.